(12) United States Patent
Lim et al.

(10) Patent No.: US 8,488,648 B2
(45) Date of Patent: Jul. 16, 2013

(54) APPARATUS AND METHOD FOR SYMBOL ERROR CORRECTABLE MODULATION AND DEMODULATION USING FREQUENCY SELECTIVE BASEBAND

(75) Inventors: In Gi Lim, Daejeon (KR); Hyung Il Park, Daejeon (KR); Sung Weon Kang, Daejeon (KR); Tae Wook Kang, Daejeon (KR); Jung Hwan Hwang, Daejeon (KR); Kyung Soo Kim, Daejeon (KR); Jung Bum Kim, Daejeon (KR); Chang Hee Hyoung, Daejeon (KR); Duck Gun Park, Daejeon (KR); Sung Eun Kim, Seoul (KR); Jin Kyung Kim, Daejeon (KR); Ki Hyuk Park, Daejeon (KR); Hyuk Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 767 days.

(21) Appl. No.: 12/674,026

(22) PCT Filed: Apr. 28, 2008

(86) PCT No.: PCT/KR2008/002398
§ 371 (c)(1),
(2), (4) Date: Feb. 18, 2010

(87) PCT Pub. No.: WO2009/028782
PCT Pub. Date: Mar. 5, 2009

(65) Prior Publication Data
US 2011/0029825 A1     Feb. 3, 2011

(30) Foreign Application Priority Data

Aug. 30, 2007  (KR) .................. 10-2007-0087866

(51) Int. Cl.
*H04B 1/00*     (2006.01)

(52) U.S. Cl.
USPC .......................... 375/130; 714/701; 714/757

(58) Field of Classification Search
USPC .. 375/130, 140, 142, 146–147, 150; 329/315; 332/117; 714/701, 757
See application file for complete search history.

(56) References Cited

U.S. PATENT DOCUMENTS

| 6,782,041 B1 * | 8/2004 | Aihara ........................ 375/150 |
| 6,795,488 B1 * | 9/2004 | Iwakiri ........................ 375/148 |

(Continued)

FOREIGN PATENT DOCUMENTS

| JP | 2001-069040 A | 3/2001 |
| JP | 2010-522446 A | 7/2010 |

(Continued)

OTHER PUBLICATIONS

T. G. Zimmerman, "Personal Area Networks: Near-field intrabody communication," IBM Systems Journal, 1996, pp. 609-617, vol. 35, Nos. 3 & 4, IBM.

(Continued)

*Primary Examiner* — Jean B Corrielus

(57) ABSTRACT

Provided are a method and apparatus using a frequency selective baseband. Symbol-error correction modulation and demodulation is performed by generating a plurality of subgroups by dividing $2^N$ spread codes or orthogonal codes used for frequency spreading into $2^M$ (M<N) spread codes or orthogonal codes; selecting (P+L) subgroups; acquiring P spread codes by inputting M data bits to each of the selected P subgroups to select one spread code among the $2^M$ spread codes of each subgroup; generating L*M parity bits for symbol error correction using P*M data bits inputted to the selected P subgroups; selecting one spread code among the $2^M$ spread codes of the L subgroups by inputting the L*M parity bits to the L subgroups; and selecting the dominant values among the (P+L) spread codes acquired from the (P+L) subgroups to generate transmitting data including the dominant values, where N, M, P, and L are real numbers.

13 Claims, 8 Drawing Sheets

U.S. PATENT DOCUMENTS

| | | |
|---|---|---|
| 6,934,317 B1 | 8/2005 | Dent |
| 7,092,431 B2 | 8/2006 | Maeda et al. |
| 7,126,981 B2 * | 10/2006 | Ho et al. ......................... 375/147 |
| 7,620,098 B2 * | 11/2009 | Hong et al. ................... 375/150 |
| 2010/0040114 A1 | 2/2010 | Kim et al. |
| 2010/0171562 A1 | 7/2010 | Lim et al. |

FOREIGN PATENT DOCUMENTS

| | | |
|---|---|---|
| JP | 2010-531606 A | 9/2010 |
| KR | 1020000041498 A | 7/2000 |
| KR | 1020040095843 A | 11/2004 |
| WO | WO 03/032511 A1 | 4/2003 |
| WO | WO 2008/060045 A1 | 5/2008 |

OTHER PUBLICATIONS

International Search Report for PCT/KR2008/002398 filed on Apr. 28, 2008.

Written Opinion of the International Searching Authority for PCT/KR2008/002398 filed on Apr. 28, 2008.

\* cited by examiner

Fig. 2

SUBGROUP 0 ($W_0$~$W_{15}$)

| W0 | 0000000000000000000000000000000000000000000000000000000000000000 |
|---|---|
| W1 | 0000000000000000000000000000000011111111111111111111111111111111 |
| W2 | 0000000000000000111111111111111111111111111111110000000000000000 |
| W3 | 0000000000000000111111111111111100000000000000001111111111111111 |
| W4 | 0000000011111111111111110000000000000000111111111111111100000000 |
| W5 | 0000000011111111111111110000000011111111000000000000000011111111 |
| W6 | 0000000011111111000000001111111111111111000000001111111100000000 |
| W7 | 0000000011111111000000001111111100000000111111110000000011111111 |
| W8 | 0000111111110000000011111111000000001111111100000000111111110000 |
| W9 | 0000111111110000000011111111000011110000000011111111000000001111 |
| W10 | 0000111111110000111100000000111111110000000011110000111111110000 |
| W11 | 0000111111110000111100000000111100001111111100001111000000001111 |
| W12 | 0000111100001111111100001111000000001111000011111111000011110000 |
| W13 | 0000111100001111111100001111000011110000111100000000111100001111 |
| W14 | 0000111100001111000011110000111111110000111100001111000011110000 |
| W15 | 0000111100001111000011110000111100001111000011110000111100001111 |

SUBGROUP 1 ($W_{16}$~$W_{31}$)

| W16 | 0011110000111100001111000011110000111100001111000011110000111100 |
|---|---|
| W17 | 0011110000111100001111000011110011000011110000111100001111000011 |
| W18 | 0011110000111100110000111100001111000011110000110011110000111100 |
| W19 | 0011110000111100110011000011110000110011110000110011000011110000 |
| W20 | 0011110011000011110000110011110000111100110000110011110000111100 |
| W21 | 0011110011000011110000110011110011000011110011000011110011000011 |
| W22 | 0011110011000011001111001100001111000011001111001100001100111100 |
| W23 | 0011110011000011001111001100001100111100001100111100001100110011 |
| W24 | 0011001111001100001100111100110000110011110011000011001111001100 |
| W25 | 0011001111001100001100111100110011001100110000110011110011000011 |
| W26 | 0011001111001100110011000011001111001100001100110011001111001100 |
| W27 | 0011001111001100110011000011001100110011110011001100110011000011 |
| W28 | 0011001100110011110011001100110011001100001100110011110011001100 |
| W29 | 0011001100110011110011001100110011001100110011000011001100110011 |
| W30 | 0011001100110011001100110011110011001100110011000011001100110011 |
| W31 | 0011001100110011001100110011001100110011001100110011001100110011 |

SUBGROUP 2 ($W_{32}$~$W_{47}$)

| W32 | 0110011001100110011001100110011001100110011001100110011001100110 |
|---|---|
| W33 | 0110011001100110011001100110011010011001100110011001100110011001 |
| W34 | 0110011001100110110011001100110011001100110011001100110011001100110110 |
| W35 | 0110011001100110110011001100110011001100110011011001100110011001 |
| W36 | 0110011010011001100110011001100110011001100110011001100101100110 |
| W37 | 0110011010011001100110011001100110011001100110011001100110011001 |
| W38 | 0110011010011001100110011001100110011001100110011001100101100110 |
| W39 | 0110011010011001100110011001100110011001101001100110011010011001 |
| W40 | 0110100110011001101001100110011010011001101001100110011010011001 |
| W41 | 0110100110011001101001100110011010011001101001100110011010011001 |
| W42 | 0110100110011001101001101100110110100110011010011001101100110110 |
| W43 | 0110100110011001101001101100110110100110011010011001101100110110 |
| W44 | 0110100101101001101001101100110110100110011010011001101100110110 |
| W45 | 0110100101101001101001101100110110100110011010011001101100110110 |
| W46 | 0110100101101001101001101100110110100110011010011001101100110110 |
| W47 | 0110100101101001101001101100110110100110011010011001101100110110 |

SUBGROUP 3 ($W_{48}$~$W_{63}$)

| W48 | 0101101001011010010110100101101001011010010110100101101001011010 |
|---|---|
| W49 | 0101101001011010010110100101101001011010010110100101101001011010 |
| W50 | 0101101001011010010101101001010110100101101001011010010110100101 |
| W51 | 0101101001011010101001011010010101101001010110100101101001011010 |
| W52 | 0101101010010101101001010110100101010110100101010110100101011010 |
| W53 | 0101101010010101101001010110100101010110100101010110100101010101 |
| W54 | 0101101010010101101010100101010110101010010101010110100101010101 |
| W55 | 0101101010010101010110101001010101010110101001010110101010100101 |
| W56 | 0101011010101001010101101010100101010110101010010101101010100101 |
| W57 | 0101011010101001010101101010100101010110101010010101101010100101 |
| W58 | 0101011010101010010101010101101010101010010101010101101010101010 |
| W59 | 0101011010101010101010101010101010101010101010101010101001010101 |
| W60 | 0101010101010110101010101010101010101010101101010101010101010101 |
| W61 | 0101010101010110101010101010101010101010101010101010101010101010 |
| W62 | 0101010101010101010101010101010101010101010101010101010101010101 |
| W63 | 0101010101010101010101010101010101010101010101010101010101010101 |

APPARATUS AND METHOD FOR SYMBOL ERROR CORRECTABLE MODULATION AND DEMODULATION USING FREQUENCY SELECTIVE BASEBAND

TECHNICAL FIELD

The present invention relates to symbol-error correction modulation and de-modulation methods and apparatuses using a frequency selective baseband, and more particularly, to symbol-error correction modulation and demodulation methods and apparatuses using a frequency selective baseband, capable of increasing a transmission data rate and implementing more stable digital communication with low power consumption through adaptation of a symbol error correction process by using a limited frequency band where an amplitude of internal-human-body transmitting signal propagating through a human body as a waveguide is larger than that of an external-human-body radiating signal excluding a frequency band of DC to 5 MHz where noise power near the human body is concentrated.

The work related to the present invention was partly supported by the IT R&D program of MIC/IITA [2006-S-072-02, Controller SoC for Human Body Communications].

BACKGROUND ART

Human-body communication is a technique for transmitting signals between apparatus connected to a human body by using the human body having conductivity as a communication channel. In the human-body communication technique, a communication network to various portable apparatuses such as personal digital assistants (PDAs), portable personal computers, digital cameras, MP3 players, and mobile phones or a communication network to fixed-type apparatuses such as printers, TVs, and entrance systems can be implemented by a user simply contacting the apparatuses.

An existing human-body communication methods, there have been proposed a method using a limited passband, a method using scrambling with user's unique ID, a method of using channel coding, a method using interleaving, a method using spreading, and the like.

In the existing human-body communication method, a passband having a central frequency fc which is used for most communication systems needs to be used in order to use the limited frequency band. Therefore, a digital-to-analog converter, an analog-to-digital converter, a central frequency converter, and the like needs to be provided to analog transmission and reception stages. Accordingly, the existing human-body communication methods have a problem in terms of low power consumption.

In addition, recently, a human-body communication method using a time-domain/frequency-domain spreading scheme for increasing a processing gain has been proposed. However, due to a limited frequency band, the human-body communication method has a problem in terms of increase in transmission data rate and efficiency of stable data communication.

On the other hand, in case of transmitting or receiving data, error detection is performed so as to check a data-transmission success ratio. In this case, parity bits are used for the error detection and correction.

In current digital communication, various linear block codes for the error correction have been researched.

In general, in the linear block codes including a Hamming code, (n−k) parity bits are added to k information bits, so that the linear block codes constitute a code word having a total of n bits. Encoding of the linear block codes can be simply implemented by calculation of a (k×n)-dimensional generating matrix. In addition, in decoding of the linear block codes, (1×(n−k))-dimensional syndrome bits are calculated by using a ((n−k)×n)-dimensional parity check matrix and a receiving signal, error pattern bits are generated from the syndrome bits, and an XOR operation is performed on the error pattern bits and the receiving signal so as to correct the error included in the receiving signal.

As an example of the linear block codes, in case of setting the number of parity bits to 4, (15, 11) Hamming code is available. In this case, the 4 parity bits are added to 11 information bits, so that a total of 15 bits are transmitted, and 1-bit error correction can be performed. In addition, in case of setting the number of parity bits to 3 (reduced parity bits), (12, 8) reduced Hamming code is available. In this case, 4 parity bits are added to 8 information bits, so that a total of 12 bits are transmitted, and 1-bit error correction can also be performed.

DISCLOSURE OF INVENTION

Technical Problem

The present invention provides symbol-error-correctable modulation and de-modulation methods and apparatuses using a frequency selective baseband in digital communication, particularly, in human-body communication, capable of implementing more stable human-body communication with low power consumption through adaptation of a symbol error correction process.

Technical Solution

According to an aspect of the present invention, there is provided a symbol-error-correction frequency modulation method using a frequency selective baseband, comprising: generating a plurality of subgroups by dividing $2^N$ (N is a real number) spread codes or orthogonal codes used for frequency spreading into $2^M$ (M<N, M is a real number) spread codes or orthogonal codes; selecting (P+L) (P and L are real numbers) subgroups among the generated subgroups; acquiring P spread codes by inputting M data bits to each of the selected P subgroups so as to select one spread code among the $2^M$ spread codes of each subgroup; generating L*M parity bits for symbol error correction by using P*M data bits inputted to the selected P subgroups; selecting one spread code among the $2^M$ spread codes of the L subgroups by inputting the L*M parity bits to the L subgroups; and selecting dominant values among the (P+L) spread codes acquired from the (P+L) subgroups to generate transmitting data including the dominant values.

In the above aspect of the present invention, the symbol-error correction frequency modulation method may further comprise converting serial data provided from an upper layer to P*M-bit parallel data, wherein the M parallel data bits are inputted to the selected P subgroups.

In addition, the symbol-error-correction frequency modulation method may further comprise: converting serial data provided from an upper layer to (P*M+1)-bit parallel data; and generating the transmitting data by performing an XOR operation on the dominant values selected from the (P+L) spread codes acquired from the (P+L) subgroups and one bit of the (P*M+1) bits.

In addition, in the selecting of the dominant values among the (P+L) spread codes acquired from the (P+L) subgroups, an AND operation may be performed on groups of two spread codes among the acquired (P+L) spread codes, an OR operation may be performed on the resulting values of the AND operation, and only a most significant bit may be selected from the resulting values of the OR operation for the (P+L) spread codes.

According to another aspect of the present invention, there is provided a symbol-error-correction frequency demodulation method using a frequency selective baseband, comprising: generating a plurality of subgroups by dividing $2^N$ (N is a real number) spread codes used for frequency spreading into $2^M$ (M<N, M is a real number) spread codes; when modulated data are transmitted from a transmitting stage, acquiring frame synchronization and timing synchronization from transmitting data; selecting (P+L) (P and L are real numbers) subgroups determined to be used for modulation of the transmitting data among the plurality of subgroups and synchronizing the spread codes of the selected subgroups with the frame synchronization and the timing synchronization; calculating correlation values between the spread codes of the (P+L) subgroups and the transmitting data and detecting one spread code determined to be selected for the modulation of the transmitting data from each of the (P+L) subgroups; generating an M-bit index value of the detected spread code of each of the (P+L) subgroups and generating L*M syndrome bits from generated (P+L)*M index values by using a parity check matrix; generating M*P error pattern bits from the L*M syndrome bits and performing an XOR operation on the generated error pattern bits and M*P index values generated from the P subgroups to correct symbol error; and converting the M*P index values of the symbol-error-corrected parallel data to serial data.

In the above aspect of the present invention, the symbol-error-correction frequency demodulation method may further comprise: acquiring 1-bit data according to the correlation values of the index values generated from the individual P subgroups; and obtaining parallel data by adding the acquired 1-bit data and the symbol-error-corrected M*P-bit parallel data and converting the parallel data to the serial data.

According to still another aspect of the present invention, there is provided a symbol-error-correction frequency modulation apparatus using a frequency selective baseband, comprising: a plurality of (P+L) (P and L are real numbers) sub-frequency selective spreaders each including one subgroup among a plurality of subgroups generated by dividing $2^N$ (N is a real number) spread codes used for frequency spreading into $2^M$ (M<N, M is a real number) spread codes, each of the P sub-frequency selective spreaders selecting and outputting one spread code among the $2^M$ spread codes of the corresponding subgroup when M data bits are inputted, and each of the L sub-frequency selective spreaders selecting and outputting one spread code among the $2^M$ spread codes of the corresponding subgroup when L*M parity bits are inputted; a serial-to-parallel conversion unit converting serial data provided from an upper layer to P*M-bit parallel data, outputting the M data bits to each of the P sub-frequency selective spreaders; a parity bit generation unit acquiring P*M data bits outputted from the serial-to-parallel conversion unit to the P sub-frequency selective spreaders, generating the L*M parity bits for symbol error correction from the acquired P*M data bits, and outputting the L*M parity bits to the L sub-frequency selective spreaders; and a dominant-value selection unit selecting dominant values from (P+L) spread codes outputted from the (P+L) sub-frequency selective spreaders.

In the above aspect of the present invention, the serial-to-parallel conversion unit may convert the serial data provided from the upper layer to (P*M+1)-bit parallel data, output M data bits to each of the selected P sub-frequency selective spreaders, and output one bit separately from the P*M bits.

In addition, the symbol-error-correction frequency modulation apparatus may further comprise an XOR logic circuit performing an XOR operation on the dominant values selected by the dominant-value selection unit and the 1 bit separately outputted from the serial-to-parallel conversion unit so as to increase a transmission data rate.

In addition, the dominant-value selection unit may perform an AND operation on groups of two spread codes among the selected (P+L) spread codes, perform an OR operation on the resulting values of the AND operations, and select only a most significant bit from the resulting values of the OR operation for the (P+L) spread codes.

According to further still another aspect of the present invention, there is provided a symbol-error-correction frequency demodulation apparatus using a frequency selective baseband, comprising: an orthogonal code generator generating a plurality of subgroups by dividing $2^N$ (N is a real number) spread codes used for frequency spreading into $2^M$ (M<N, M is a real number) spread codes, acquiring frame synchronization and timing synchronization from transmitting data, which is modulated data transmitted from a transmitting stage, selecting (P+L) (P and L are real numbers) subgroups determined to be used for modulation of the transmitting data among the plurality of subgroups, and synchronizing and outputting the spread codes of the (P+L) subgroups with the acquired frame synchronization and timing synchronization; a plurality of (P+L) sub-frequency selective despreaders each receiving, in a case where the modulated transmitting data is received from the transmitting stage, $2^M$ spread codes from the orthogonal code generator, calculating correlation values between the provided spread codes and the transmitting data, detecting one spread code determined to be selected for the modulation of the transmitting data, and outputting an M-bit index value of the detected spread code; a syndrome generation unit receiving (P+L)*M index values from the(P+L) sub-frequency selective despreaders provided with the spread codes of each of the (P+L) subgroups from the orthogonal code generator and generating L*M syndrome bits from the input index values by using a parity check matrix; an error pattern generation unit which generating M*P error pattern bits from the L*M syndrome bits; an error bit correction unit performing an XOR operation on M*P index values outputted from the P sub-frequency selective despreaders and the M*P error pattern bits generated by the error pattern generation unit to correct symbol error of the M*P index values; and a parallel-to-serial conversion unit converting the M*P index values of the symbol-error-corrected parallel data to serial data.

In the above aspect of the present invention, the symbol-error-correction frequency demodulation apparatus may further comprise a correlation value determination unit receiving the correlation values of the index values outputted from the (P+L) sub-frequency selective despreaders and outputting different 1-bit data according to the received correlation values.

In addition, in a case where 1-bit data outputted from the correlation value determination unit together with the P*M index values outputted from the error bit correction unit are inputted, the parallel-to-serial conversion unit may convert parallel data obtained by adding the P*M index values and the 1-bit data to the serial data.

Advantageous Effects

According to symbol-error-correctable modulation and demodulation methods and apparatuses using a frequency selective baseband of the present invention, it is possible to increase a processing gain of an entire system and to increase a transmission data rate by using serial-to-parallel conversion, frequency selective baseband transmission, and the limited number of spread codes in a digital communication.

In addition, according to symbol-error-correctable modulation and demodulation methods and apparatuses using a frequency selective baseband of the present invention, configurations of analog transmitting and receiving stages can be minimized by using a frequency selective baseband transmission scheme, and parity bits for symbol error correction instead of a portion of transmitting bits are added for configuration of symbols in serial-to-parallel conversion, so that it is possible to reduce power consumption of an entire digital communication system.

BRIEF DESCRIPTION OF THE DRAWINGS

FIG. 2 is a view illustrating subgroups of 64 Walsh codes according to an embodiment of the present invention.

BEST MODE FOR CARRYING OUT THE INVENTION

Figure 1:
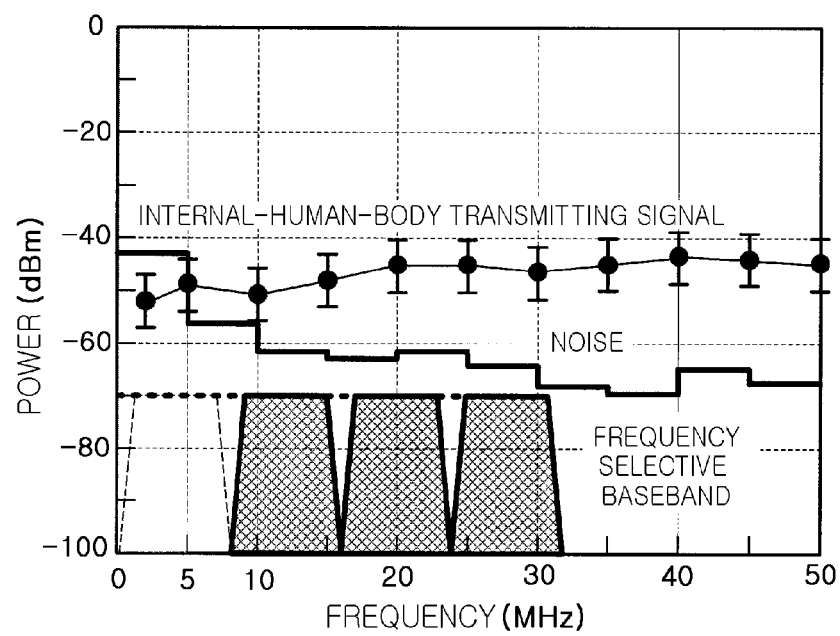
FIG. 1 is a graph illustrating a relationship among a frequency selective baseband for human-body communication, a frequency-varying internal-human-body transmitting signal power, and an external-human-body noise power.

Hereinafter, embodiments of the present invention will be described in detail with reference to the accompanying drawings so that the ordinarily skilled in the art can easily implement the embodiments. However, in the detailed description of operational principles of the embodiments of the present invention, detailed description of well-known construction and operations will be omitted for clarifying the present invention.

In addition, in the drawings, elements having similar functions and operations are denoted by the same reference numerals.

The present invention can be adapted to a digital communication system, particularly, a human-body communication system. Hereinafter, for the convenience of description, the human-body communication system will be exemplified.

FIG. 1 is a graph illustrating a relationship among a frequency selective baseband for human-body communication, a frequency-varying internal-human-body transmitting signal power, and an external-human-body noise power.

The graph of FIG. 1 illustrates results of measurement of interference signals induced into a human body in various measurement positions.

As shown in FIG. 1, in the human-body communication according to the embodiment of the present invention, a frequency selective baseband within a frequency band of 5 MHz to 40 MHz excluding a frequency band of DC to 5 MHz where the largest noise power occurs and a frequency band of 40 MHz or more where an external-human-body radiating signal power is larger than an internal-human-body transmitting signal power.

In the present invention, a frequency selective baseband transmission scheme denotes a transmission scheme where an analog transceiver can obtain a desired frequency band and a processing gain during baseband transmission by only "the spread codes having the most dominant frequency characteristics in a user's desired frequency band" among all the spread codes used for obtaining a processing gain of data.

FIG. 1 exemplifies a case of using the spread codes for frequency selection. As an example, 64 Walsh codes are used as the spread codes. The 64 Walsh codes obtained by dividing a frequency band of 0 to 32 MHz by 64 are sequentially and uniformly distributed with most dominant frequencies. The first subgroup using a frequency band of DC to 5 MHz having the largest noise power is excluded, and the remaining 3 subgroups using the other frequency bands are selected, so that the frequency selective baseband transmission using a desired frequency band can be performed.

FIG. 2 is a view illustrating subgroups of the 64 Walsh codes according to the embodiment of the present invention.

As shown in FIG. 2, the 64 Walsh codes are used for the spread codes according to the embodiment of the present invention. The 64 Walsh codes may be divided into 4 subgroups having 16 Walsh codes. As a result, subgroup 0, subgroup 1, subgroup 2, and subgroup 3 include 16 Walsh codes $W_0$ to $W_{15}$, 16 Walsh codes $W_{16}$ to $W_{31}$, 16 Walsh codes W32 to W47, and 16 Walsh codes $W_{48}$ to $W_{63}$, respectively.

On the other hand, the 64 Walsh codes $W_0$ to $W_{63}$ can be used to exactly divide a using frequency band into 64 frequency bands, so that most dominant frequencies fd of the Walsh codes can be sequentially mapped to the divided frequency bands.

As an example, in a case where a spreading frequency band for the entire Walsh codes is assumed to be 32 MHz, an interval of a most dominant frequency fd for a Walsh code is 0.5 MHz (=32 MHz/64). Therefore, the Walsh codes $W_1$, $W_{48}$, and $W_{63}$ have the most dominant frequencies fd of 1 MHz, 24.5 MHz, and 32 MHz, respectively.

In the embodiment of the present invention shown in FIG. 1, the subgroup 1 ($W_{16}$ to $W_{31}$), the subgroup 2 ($W_{32}$ to $W_{47}$), and the subgroup 3 ($W_{48}$ to $W_{63}$) excluding the subgroup 0 are selected., so that the Walsh codes having the most dominant frequencies fd in a frequency band of 8.5 MHz to 32 MHz among the entire frequency band of 0 to 32 MHz are used.

Now, modulation and demodulation methods and apparatuses using the Walsh codes and a symbol-error-correctable frequency selective baseband will be described in detail.

In the modulation and demodulation methods and apparatuses using the frequency selective baseband according to the embodiment of the present invention, the 64 Walsh codes are used as the spread codes, and the human-body communication frequency band shown in FIG. 1 is used as the frequency band. In addition, the subgroup 1 ($W_{16}$ to $W_{31}$), the subgroup 2 ($W_{32}$ to $W_{47}$), and the subgroup 3 ($W_{48}$ to $W_{63}$) excluding the subgroup 0 are selected among the 4 subgroups shown in FIG. 2, so that the 48 Walsh codes among the entire 64 Walsh codes are selectively used.

In addition, the modulation and demodulation methods and apparatuses using the frequency selective baseband according to the embodiment of the present invention, (12,8) reduced Hamming codes are used as an example of a linear block code for symbol error correction.

Figure 3:
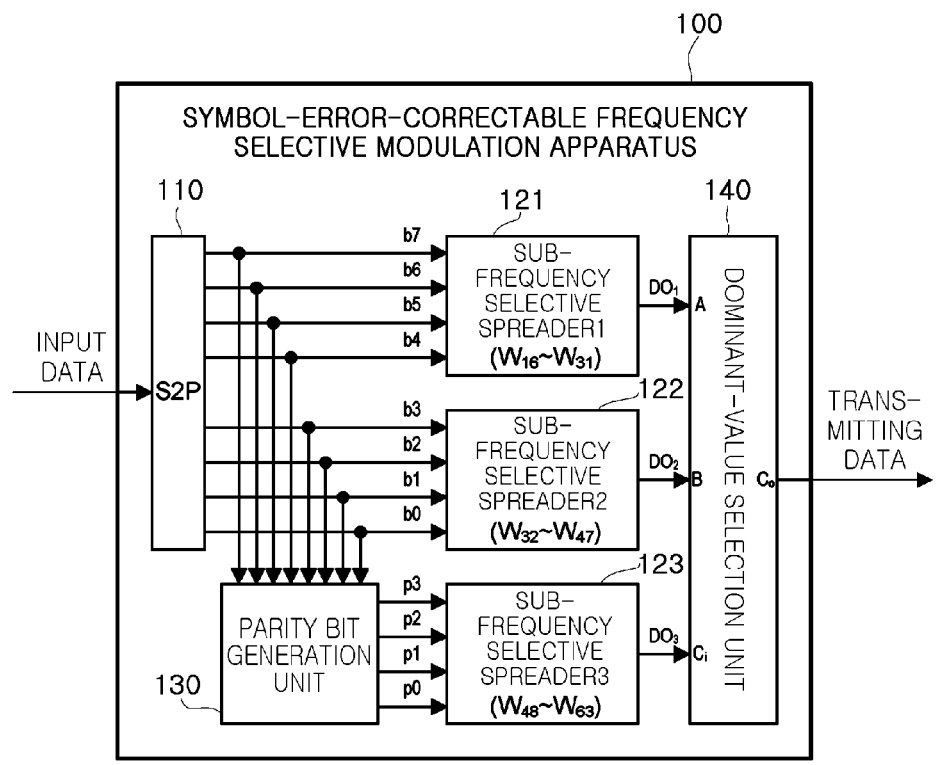
FIG. 3 is a view illustrating a configuration of a symbol-error-correctable frequency selective modulation apparatus according to an embodiment of the present invention.

FIG. 3 is a view illustrating a configuration of a symbol-error-correctable frequency selective modulation apparatus according to an embodiment of the present invention.

As shown in FIG. 3, the symbol-error-correctable frequency selective modulation apparatus 100 includes a serial-to-parallel conversion unit (hereinafter, referred to as 'S2P') 110, a plurality of sub-frequency selective spreaders 121 to 123, a parity bit generation unit 130, and a dominant-value selection unit 140.

In the frequency selective modulation apparatus 100, the S2P 110 converts an inputted serial data to 8-bit parallel data and outputs groups of 4 bits of the converted parallel data to the sub-frequency selective spreader 1 (121) and the sub-frequency selective spreader 2 (122). In addition, the S2P 110 outputs the converted 8-bit parallel data b7 to b0 to the parity bit generation unit 130.

As an example, when the S2P 110 is inputted with a bit sequence of to-be-transmitted data at a transmission rate of 8 Mbps, the S2P 110 converts the bit sequence to 8-bit parallel data b7 to b0 and outputs the converted parallel data at a transmission rate of 1 Mbps.

In the frequency selective modulation apparatus 100, the parity bit generation unit 130 generates 4 parity bits p3 to p0 for error detection and correction from the inputted 8-bit parallel data.

On the other hand, the frequency selective modulation apparatus 100 does not use the Walsh codes ($W_o$ to $W_{15}$) for a frequency band having the large noise power.

Therefore, the sub-frequency selective spreader 1 (121) is inputted with 4 bits b7 to b4 among outputs of the S2P 110 and selects one Walsh code among the Walsh codes $W_{16}$ to $W_{31}$ to output the bit $DO_1$ at a transmission rate of 64 Mbps. The sub-frequency selective spreader 2 (122) is inputted with 4 bits b3 to b0 among the outputs of the S2P 110 and selects one Walsh code among the Walsh codes $W_{32}$ to $W_{47}$ to output the bit $DO_2$ at a transmission rate of 64 Mbps. The sub-frequency selective spreader 3 (123) is inputted with 4 bits p3 to p0 from the parity bit generation unit 130 and selects one Walsh code among the Walsh codes $W_{48}$ to $W_{63}$ to output the bit $DO_3$ at a transmission rate of 64 Mbps.

The dominant-value selection unit 140 is inputted as A, B, and Ci (Carry-in) with the 3 bits $DO_1$, $DO_2$, and $DO_3$ outputted from the sub-frequency selective spreaders 121 to 123, respectively, and calculates Co (Carry-out) as a final output of the corresponding frequency selective modulation apparatus 100 by using the following Equation 1.

$$Co = (A \text{ and } B) \text{ or } (B \text{ and } Ci) \text{ or } (Ci \text{ and } A) \quad \text{[Equation 1]}$$

In Equation 1, operators "or" and "and" denote an OR gate and an AND gate, respectively.

Therefore, due to the aforementioned configuration and operations, the symbol-error-correctable frequency selective modulation apparatus 100 can increase the transmission data rate by using serial-to-parallel conversion, frequency selective baseband transmission scheme, and the limited number of spread codes and transmits the spread code groups having the parity bits added into a portion of spread code groups for frequency selective multiple transmission, so that a receiving stage can corrects errors in symbols by using the parity bits.

In addition, in order to further increase the transmission data rate, in the symbol-error-correctable frequency selective modulation apparatus 100, the S2P 110 may be constructed with 9 bits (with 1 bit added) and a value obtained by performing an XOR operation on the output of the dominant-value selection unit 140 and the added 1 bit may be generated as a final output value of the frequency selective modulation apparatus 100.

Figure 4:
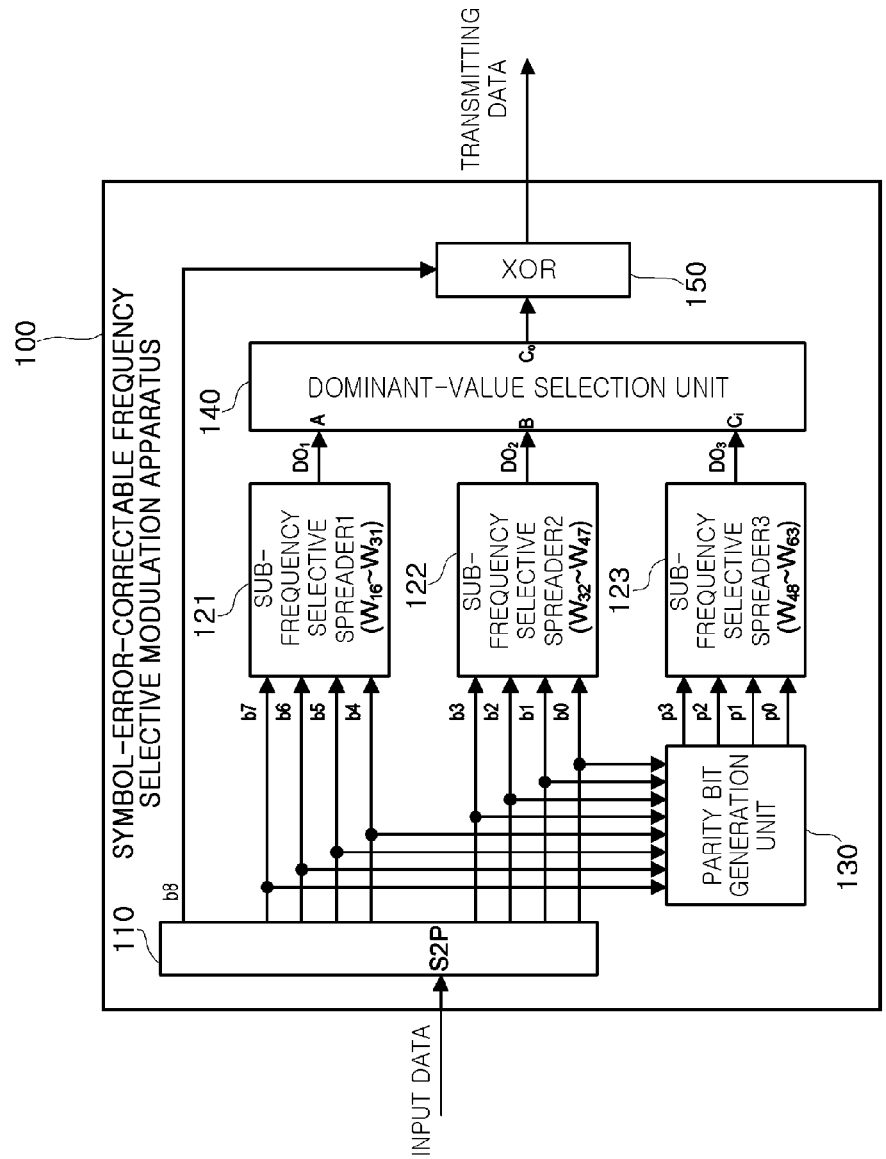
FIG. 4 is a view illustrating a configuration of a symbol-error-correctable frequency selective modulation apparatus according to another embodiment of the present invention.

FIG. 4 is a view illustrating a configuration of a symbol-error-correctable frequency selective modulation apparatus 100 according to another embodiment of the present invention.

As shown in FIG. 4, the frequency selective modulation apparatus 100 according to another embodiment of the present invention may include an S2P 110, a plurality of sub-frequency selective spreaders 121 to 123, a parity bit generation unit 130, a dominant-value selection unit 140, and an XOR logic circuit 150.

In the frequency selective modulation apparatus 100 having such a configuration, the S2P 110 is inputted with a serial data bit sequence at a transmission rate of 9 Mbps and converts the serial data bit sequence to 9-bit parallel data b8 to b0 to output the 9-bit parallel data at a transmission rate of 1 Mbps.

In addition, as shown in FIG. 3, in the frequency selective modulation apparatus 100, the subgroup 0 including the Walsh codes in a frequency band having the large noise power is not used, and the sub-frequency selective spreaders 1 (121) and 2 (122) are inputted with the bits b7 to b4 and b3 to b0 among the outputs of the S2P 110, respectively. The parity bit generation unit 130 of the frequency selective modulation apparatus is inputted with the bit b7 to b0 among the outputs of the S2P 110 and generates 4 parity bits p3 to p0 for the error detection and correction to output the 4 parity bits to the sub-frequency selective spreader 3 (123).

Therefore, each of the sub-frequency selective spreaders 1 (121), 2 (122), and 3 (123) selects on Walsh code included in each of the subgroups 1, 2, and 3 to output the bits $DO_1$, $DO_2$, and $DO_3$ at a transmission rate of 64 Mbps, respectively.

In the frequency selective modulation apparatus 100, the bits $DO_1$, $DO_2$, and $DO_3$ are input as input values A, B, and Ci to the dominant-value selection unit 140, and the dominant-value selection unit 140 calculates the output value Co by using Equation 1 and inputs the output value Co to the XOR logic circuit 150.

The XOR logic circuit 150 performs an XOR operation on the output value Co of the dominant-value selection unit 140 and the output b8 of the S2P 110 to generate the resulting value of the XOR operation as a final output value of the frequency selective modulation apparatus 100.

Now, the sub-frequency selective spreaders included in the frequency selective modulation apparatus 100 will be described in brief.

Figure 5:
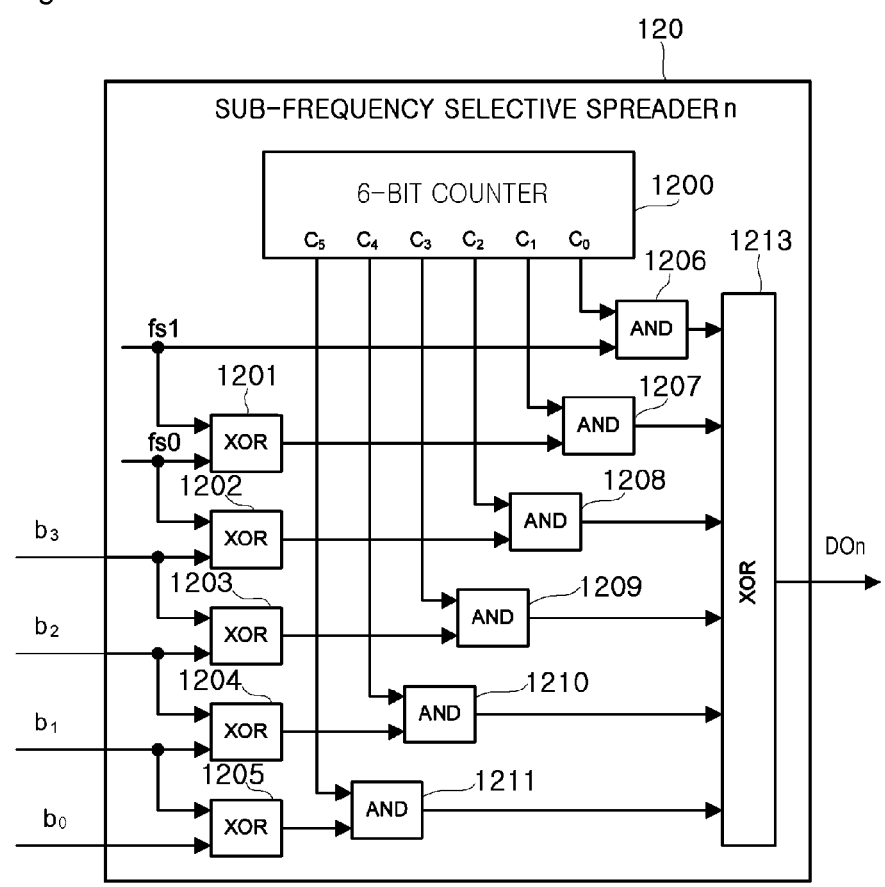
FIG. 5 is a view illustrating a configuration of a sub-frequency selective spreader according to an embodiment of the present invention.

FIG. 5 is a view illustrating a configuration of a sub-frequency selective spreader 120 according to an embodiment of the present invention.

Referring to FIG. 5, the sub-frequency selective spreader 120 includes a 6-bit counter 1200 which is driven with a 64 MHz clock, 5 XOR logic circuits 1201 to 1205 for gray indexing using 2-bit frequency selection control bits fs 1 and fs0, the least significant 4 data input bits b3, b2, b1, and b0, 6 AND logic circuits 1206 to 1211, and an XOR logic circuit 1213 for performing an XOR operation on the outputs of the AND logic circuits.

The two frequency selection control bits fs1 and fs0 are set to be different among the subgroups. For example, the two frequency selection control bits fs1 and fs0 of the sub-frequency selective spreader 1 (121) for the subgroup 1 ($W_{16}$ to $W_{31}$) are set to 0 and 1, respectively. The two frequency selection control bits fs1 and fs0 of the sub-frequency selective spreader 2 (122) for the subgroup 2 ($W_{32}$ to $W_{47}$) are set to 1 and 0, respectively. The two frequency selection control bits fs1 and fs0 of the sub-frequency selective spreader 3 (123) for the subgroup 3 ($W_{48}$ to $W_{63}$) are set to 1 and 1, respectively.

The 6 AND logic circuits 1206 to 1211 are inputted with outputs $C_5$ to $C_0$ of the 6-bit counter 1200, the most significant bit fs1 among the frequency selection control bits, and output bits of the 5 XOR logic circuits 1201 to 1205 and performs AND operations thereon to output the resulting value of the AND operation thereof, respectively.

Finally, the sub-frequency selective spreader 120 generates an output $DO_n$ by using the following Equation 2 and output the output $DO_n$.

$$DO_n = (fs1 \text{ and } C_0) \text{ xor } [(fs1 \text{ xor } fs0) \text{ and } C_1] \text{ xor } [(fs0 \text{ xor } b3) \text{ and } C_2] \text{ xor } [(b3 \text{ xor } b2) \text{ and } C_3] \text{ xor } [(b2 \text{ xor } b1) \text{ and } C_4] \text{ xor } [(b1 \text{ xor } b0) \text{ and } C_5] \quad \text{[Equation 2]}$$

Figure 6:
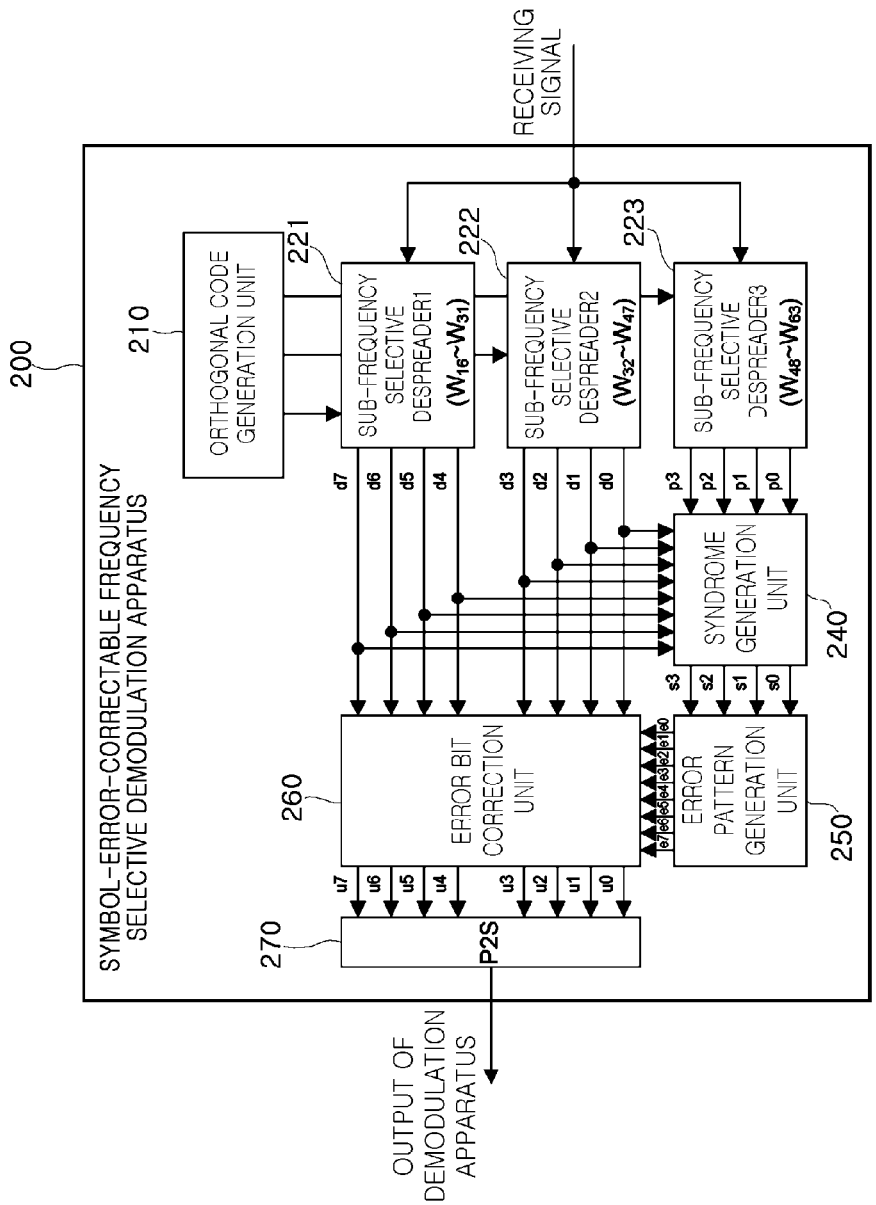
FIG. 6 is a view illustrating a configuration of a symbol-error-correctable frequency selective demodulation apparatus according to an embodiment of the present invention.

FIG. 6 is a view illustrating a configuration of a symbol-error-correctable frequency selective demodulation apparatus 200 according to an embodiment of the present invention.

Referring to FIG. 6, the symbol-error-correctable frequency selective demodulation apparatus 200 may include a orthogonal code generation unit 210, 3 sub-frequency selective despreaders 221 to 223, a syndrome generation unit 240, an error pattern generation unit 250, an error bit correction unit 260, a parallel-to-serial conversion unit (hereinafter, referred to as 'P2S') 270.

In FIG. 6, a receiving signal of the frequency selective demodulation apparatus 200 is assumed to be a receiving signal of which frame synchronization and timing synchronization are acquired by a receiving-signal synchronization unit (not shown) disposed at a front stage thereof.

The orthogonal code generation unit 210 generates 48 Walsh codes synchronized with the acquired frame synchronization and timing synchronization and outputs the 48 Walsh codes to the sub-frequency selective despreaders 221 to 223. Particularly, the orthogonal code generation unit 210 can output the Walsh codes $W_{16}$ to $W_{31}$ of the subgroup 1, the Walsh codes $W_{32}$ to $W_{47}$ of the subgroup 2, and the Walsh codes $W_{48}$ to $W_{63}$ of the subgroup 3 to the sub-frequency selective despreaders 1 (221), 2 (222), and 3 (223), respectively.

Each of the sub-frequency selective despreaders 221 to 223 is inputted with the synchronized receiving signal at a transmission rate of 64 Mbps and calculates a correlation value between the receiving signal and the Walsh codes provided from the orthogonal code generation unit 210. Each of the sub-frequency selective despreaders 221 to 223 detects Walsh codes used for modulation by using the correlation value and outputs a 4-bit index value of the detected Walsh code at a transmission rate of 1 Mbps.

Now, the sub-frequency selective despreaders 221 to 223 will be described in detail. Firstly, the sub-frequency selective despreader 1 (221) calculates the correlation value between the receiving signal and the 16 Walsh codes $W_{16}$ to $W_{31}$ provided from the orthogonal code generation unit 210. The sub-frequency selective despreader 1 (221) detects the Walsh code (one of the Walsh codes $W_{16}$ to $W_{31}$) used for modulation by using the correlation value and outputs a 4-bit parallel index value b7 to b4 at a transmission rate of 1 Mbps.

The sub-frequency selective despreader 2 (222) calculates the correlation value between the receiving signal and the 16 Walsh codes $W_{32}$ to $W_{47}$ provided from the orthogonal code generation unit 210. The sub-frequency selective despreader 2 (222) detects the Walsh code (one of the Walsh codes $W_{32}$ to $W_{47}$) used for modulation by using the correlation value and outputs a 4-bit parallel index value b3 to b0. The subfrequency selective despreader 3 (223) calculates the correlation value between the receiving signal and the 16 Walsh codes $W_{48}$ to $W_{63}$ provided from the orthogonal code generation unit 210. The sub-frequency selective despreader 3 (223) detects the Walsh code (one of the Walsh codes $W_{48}$ to $W_{63}$) used for modulation by using the correlation value and outputs a 4-bit parallel index value p3 to p0.

The syndrome generation unit 240 generates 4 syndrome bits s3 to s0 through a parity check matrix by using the index values outputted from the sub-frequency selective despreaders 221 to 223, that is, the 12 bits d7 to d0 and p3 to p0.

The error pattern generation unit 250 generates 8 error pattern bits e7 to e0 by using the 4 syndrome bits generated by the syndrome generation unit 240. Herein, the 8 error pattern bits are used to be indicated as 1 in an error bit included in the current symbol.

The error bit correction unit 260 performs an XOR operation on the 8 bits d7 to d0 outputted from the sub-frequency selective despreaders 1 (221) and 2 (222) and the 8 error pattern bits e7 to e0 outputted from the error pattern generation unit 250 to correct error included in the data symbol transmitted from the frequency selective modulation apparatus 100. As a result, the error bit correction unit 260 outputs symbol-error-corrected 8 bits u7 to u0.

The P2S 270 converts the 8 bits u7 to u0 outputted from the error bit correction unit 260 to a 1-bit output having a transmission rate of 8 Mbps of the frequency selective demodulation apparatus 200.

In addition, the frequency selective demodulation apparatus 200 may perform a de-modulation function corresponding to the frequency selective modulation apparatus 100 of FIG. 4 in order to further increase the transmission data rate.

Figure 7:
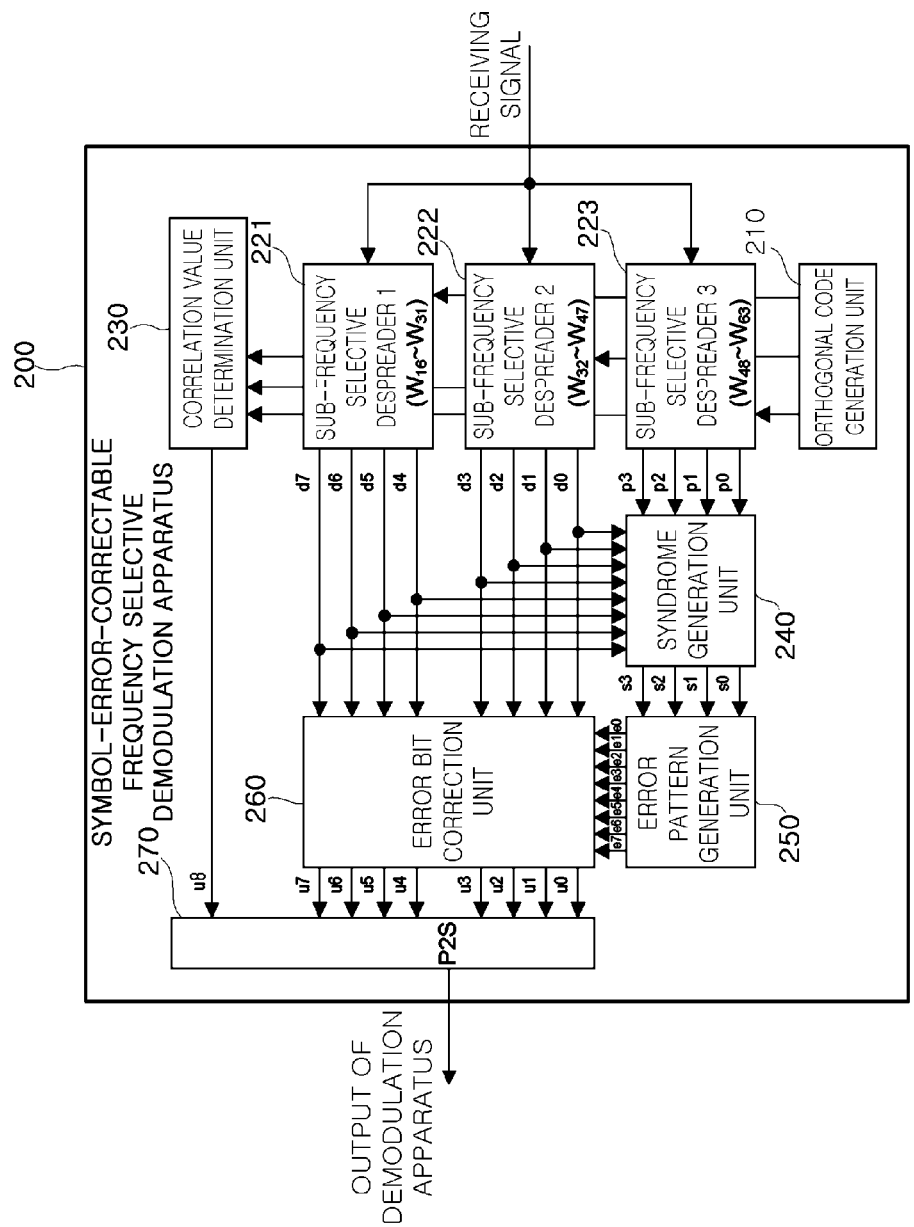
FIG. 7 is a view illustrating a configuration of a symbol-error-correctable frequency selective demodulation apparatus according to another embodiment of the present invention.

FIG. 7 is a view illustrating a configuration of a symbol-error-correctable frequency selective demodulation apparatus 200 according to another embodiment of the present invention.

Referring to FIG. 7, the symbol-error-correctable frequency selective demodulation apparatus 200 according to another embodiment of the present invention may include a orthogonal code generation unit 210, 3 sub-frequency selective despreaders 221 to 223, a correlation value determination unit 230, a syndrome generation unit 240, an error pattern generation unit 250, an error bit correction unit 260, and a P2S 270.

Similarly to FIG. 6, in FIG. 7, a receiving signal of the frequency selective de-modulation apparatus 200 is assumed to be a receiving signal of which frame synchronization and timing synchronization are acquired by the receiving-signal synchronization unit disposed at a front stage thereof.

The orthogonal code generation unit 210 generates 48 Walsh codes synchronized according to the acquired frame synchronization and timing synchronization and outputs the Walsh codes $W_{16}$ to $W_{31}$ of the subgroup 1, the Walsh codes $W_{32}$ to $W_{47}$ of the subgroup 2, and the Walsh codes $W_{48}$ to $W_{63}$ of the subgroup 3 to the sub-frequency selective despreaders 1 (221), 2 (222), and 3 (223), respectively.

Each of the sub-frequency selective despreaders 221 to 223 is inputted with the synchronized receiving signal at a transmission rate of 64 Mbps and calculates a correlation value between the receiving signal and the Walsh codes provided from the orthogonal code generation unit 210. Each of the sub-frequency selective despreaders 221 to 223 detects Walsh codes used for modulation by using the correlation value and outputs a 4-bit index value of the detected Walsh code at a transmission rate of 1 Mbps.

The sub-frequency selective despreaders 1 (221), 2 (222), and 3 (223) calculate the corresponding correlation value between the receiving signal and the Walsh codes of the subgroups 1, 2, and 3, respectively. The sub-frequency selective despreaders 1 (221), 2 (222), and 3 (223) detect the corresponding Walsh codes used for modulation by using the corresponding correlation values and output 4-bit parallel index values d7 to d4, d3 to d0, and p3 to p0 at a transmission rate of 1 Mbps, respectively.

The sub-frequency selective despreaders 221 to 223 finally select the index values and provide correlation values of the finally-selected index values to the correlation value determination unit 230.

The correlation value determination unit 230 outputs to the P2S 270 the bit u8 at a transmission rate of 1 Mbps according to the correlation values provided from the sub-frequency selective despreaders 221 to 223.

For example, in a case where there is no noise-originated error in a transmission channel, if the bit u8 is 0 in a transmitting stage, that is, the frequency selective modulation apparatus 100 according to another embodiment of the present invention, all the correlation values of the finally-selected index values of the sub-frequency selective despreaders 221 to 223 may be 16, and remaining index values may be 32. If the bit U8 is 1 at the transmitting stage, all the correlation values of the finally-selected index values of the sub-frequency selective despreaders 221 to 223 may be 48, and remaining index values may be 32.

Therefore, if the sub-frequency selective despreaders 221 to 223 provide the correlation values of 16, the correlation value determination unit 230 outputs the bit u8 of 0 to the P2S 270. If the sub-frequency selective despreaders 221 to 223 provide the correlation values of 48, the correlation value determination unit 230 outputs the bit u8 of 1 to the P2S 270.

The syndrome generation unit 240 generates 4 syndrome bits s3 to s0 through a parity check matrix by using the index values outputted from the sub-frequency selective despreaders 221 to 223, that is, the 12 bits d7 to d0 and p3 to p0. The error pattern generation unit 250 generates 8 error pattern bits e7 to e0 by using the 4 syndrome bits generated by the syndrome generation unit 240. Herein, the 8 error pattern bits are used to be indicated as 1 in an error bit included in the current symbol.

The error bit correction unit 260 performs an XOR operation on the 8 bits d7 to d0 outputted from the sub-frequency selective despreaders 1 (221) and 2(222) and the 8 error pattern bits e7 to e0 outputted from the error pattern generation unit 250 to correct error included in the data symbol transmitted from the frequency selective modulation apparatus 100. As a result, the error bit correction unit 260 outputs symbol-error-corrected 8 bits u7 to u0.

The P2S 270 converts the 8 bits u7 to u0 outputted from the error bit correction unit 260 and the 1 bit u8 outputted from the correlation value determination unit 230 to a 1-bit output having a transmission rate of 9 Mbps of the frequency selective de-modulation apparatus 200.

Now, a human-body communication system, that is, a digital communication system employing the symbol-error-correctable frequency selective modulation and de-modulation apparatuses using a frequency selective baseband will be described in detail.

Figure 8:
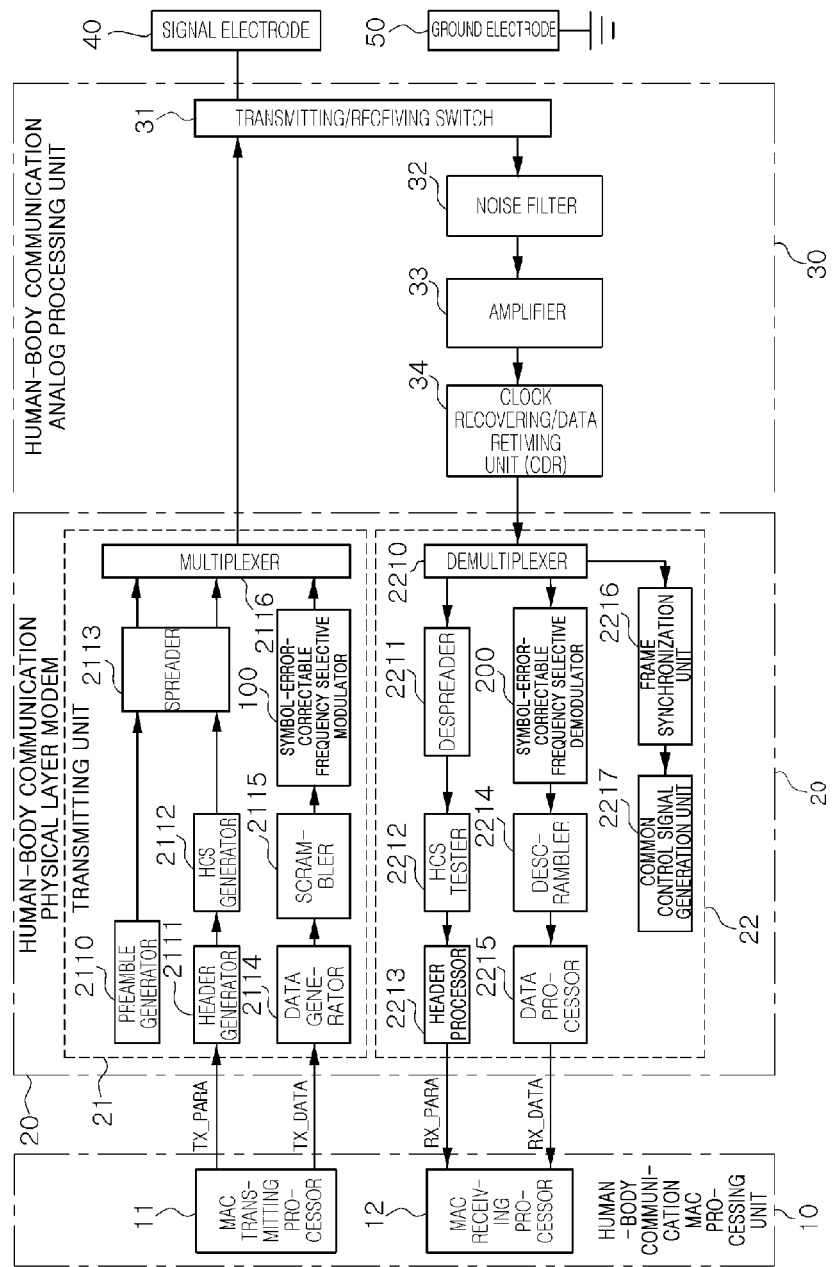
FIG. 8 is a view illustrating a configuration of a human-body communication system using a symbol-error-correctable frequency selective baseband according to an embodiment of the present invention.

FIG. 8 is a view illustrating a configuration of a symbol-error-correctable human-body communication system using a frequency selective baseband according to an embodiment of the present invention.

Referring to FIG. 8, the human-body communication system may include a MAC processing unit 10, a physical layer modem unit 20, an analog processing unit 30, a signal electrode 40, and a ground electrode 50.

In the human-body communication system, the human-body communication MAC processing unit 10 includes a MAC transmitting processor 11 and a MAC receiving processor 12. The human-body communication MAC processing unit 10 transfers to-be-transmitted data and data information (transmission rate, modulation scheme, user ID, data length, etc) received from an upper layer to a transmitting unit of a physical layer modem unit 20. In addition, the human-body communication MAC processing unit 10 transfers data and data information received from the physical layer modem unit 20 to the upper layer.

The physical layer modem unit 20 includes the transmitting unit 21 and a receiving unit 22. The transmitting unit 21 mainly includes a preamble/header transmitting processing unit (2110, 2111, 2112, 2113), a data transmitting processing unit (2114, 2115, 100), and a multiplexer 2116.

The preamble/header transmitting processing unit (2110, 2111, 2112, 2113) has functions of spreading a frame-synchronization preamble and header information. The preamble/header transmitting processing unit (2110, 2111, 2112, 2113) includes a preamble generator 2110, a header generator 2111, an HCS generator 2112, and spreader 2113. The data transmitting processing unit (2114, 2115, 100) has functions of spreading data (that is to be transmitted through human-body communication) into spread codes having the best frequency characteristics in a user's desired frequency band, that is, the frequency selective spread codes. The data transmitting processing unit (2114, 2115, 100) includes a data generator 2114, a scrambler 2115, and a symbol-error-correctable frequency selective modulator 100.

In particular, the symbol-error-correctable frequency selective modulator 100 of the data transmitting processing unit (2114, 2115, 100) modulates 8 Mbps or 9 Mbps serial data (scrambled by the data generator 2114 and the scrambler 2115) to transmitting data using the serial-to-parallel conversion, the frequency selective baseband transmission scheme, and the limited number of spread codes according to the configuration and operations shown in FIG. 3 or 4 of the aforementioned embodiments. Herein, the symbol-error-correctable frequency selective modulator 100 may perform modulation of the transmitting data so as to add 4 parity bits for error detection and correction into a portion of a spread code group.

The multiplexer 2116 multiplexes the preamble and the header generated through the spreading of the preamble/header transmitting processing unit (2110, 2111, 2112, 2113) and the frequency-selective-modulated data outputted from the data transmitting processing unit (2114, 2115, 100) to transmit a digital signal.

Accordingly, the digital signal transmitted from the multiplexer 2116 of the transmitting unit 21 can be adapted to the baseband transmission of the frequency selective modulator 100, so that the digital signal can be transmitted through a transmitting/receiving switch 31 and the signal electrode 40 into a human body without separate configurations for analog transmitting processes. The ground electrode 50 is disposed to provide a reference voltage.

The analog processing unit 30 is divided to a portion for transmitting the digital signal of the transmitting unit into the human body, that is, the transmitting/receiving switch 31 and the signal electrode 40 and a portion for receiving the digital signal from the human body and transferring the receiving unit 22 of the physical layer modem unit, that is, the signal electrode 40, the transmitting/receiving switch 31, a noise filter 32, an amplifier 33, and a clock recovering/data returning unit (CDR) 34.

In the analog processing unit 30 having the aforementioned configuration, noise of the receiving signal (inputted through the signal electrode 40) that is originated from the internal-human-body transmission is removed through the transmitting/receiving switch 31 and the noise filter 32, the receiving signal is amplified to have a desired signal amplitude by the amplifier 33, and timing synchronization and frequency offset of the receiving signal are compensated based on a clock of a receiving stage by the clock recovering/data retiming unit 34.

The receiving signal of which timing synchronization and frequency offset are compensated is output to the receiving unit 22 of the physical layer modem unit 20.

The receiving unit 22 of the physical layer modem unit 20 mainly includes a demultiplexer 2210, a header receiving processing unit (2211, 2212, 2213), and a data receiving processing unit (200, 2214, 2215). The receiving unit 22 further includes a frame synchronization unit 2216 and common control signal generation unit 2217 to acquire frame synchronization of the receiving signal and generate common control signals used for the transmitting unit and the receiving unit 22 of the physical layer modem unit.

In the physical layer modem unit 20, the demultiplexer 2210 has functions of extracting a preamble, headers, and data from the digital signal transmitted through the human-body channel. The header receiving processing unit (2211, 2212, 2213) has functions of despreading the extracted header to recover original data information. The header receiving processing unit (2211, 2212, 2213) includes a despreader 2211, an HCS tester 2212, and a header processor 2213.

The data receiving processing unit (200, 2214, 2215) has functions of despreading the extracted date into spread codes having the best frequency characteristics in a user's desired frequency band. The data receiving processing unit (200, 2214, 2215) includes a symbol-error-correctable frequency selective demodulator 200, a descrambler 2214, and a data processor 2215.

In particular, when data are input through the demultiplexer 2210, the frequency selective demodulator 200 of the data receiving processing unit (200, 2214, 2215) acquires correlation values using a frequency selective baseband and spread codes used for transmission, corrects errors included in the input data symbol by using the finally-selected index values, and demodulates the error-corrected data into 8 Mbps or 9 Mbps serial data according to the configurations and operations shown in FIG. 6 or 7 of the aforementioned embodiment.

As described above, a human-body communication system according to the embodiment of the present invention is provided with a frequency selective modulator and a frequency selective demodulator to efficiently combine serial-to-parallel conversion of data, a frequency selective baseband, and the limited number of spread codes, so that it is possible to increase a processing gain of the entire system and to increase a data transmission rate. In addition, in a transmitting stage, parity bits for symbol error correction are added into a portion of a spread code group, and in a receiving stage, errors included in the symbol is corrected by using the parity bits, so that it is possible to implement more stable human-body communication even in a poor human-body communication channel environment.

While the present invention has been particularly shown and described with reference to exemplary embodiments thereof, it will be understood by those skilled in the art that various changes in form and details may be made therein without departing from the spirit and scope of the present invention as defined by the appended claims.

Particularly, the present invention is described through embodiments using spread codes for frequency selection, but not limited thereto. As alternative embodiments, orthogonal codes may be used for the frequency selection.

The invention claimed is:

1. A symbol-error correction frequency modulation method using a frequency selective baseband, comprising:
generating a plurality of subgroups by dividing $2^N$ (N is a real number) spread codes or orthogonal codes used for frequency spreading into $2^M$ (M<N, M is a real number) spread codes or orthogonal codes;
selecting (P+L) (P and L are real numbers) subgroups among the generated subgroups;
acquiring P spread codes by inputting M data bits to each of the selected P subgroups so as to select one spread code among the $2^M$ spread codes of each subgroup;
generating L*M parity bits for symbol error correction by using P*M data bits input to the selected P subgroups;
selecting one spread code among the $2^M$ spread codes of the L subgroups by inputting the L*M parity bits to the L subgroups; and
selecting dominant values among the (P+L) spread codes acquired from the (P+L) subgroups to generate transmitting data including the dominant values.

2. The symbol-error correction frequency modulation method of claim 1, further comprising:
converting serial data provided from an upper layer to P*M-bit parallel data, wherein the M parallel data bits are inputted to the selected P subgroups.

3. The symbol-error correction frequency modulation method of claim 1, further comprising:
converting serial data provided from an upper layer to (P*M+1)-bit parallel data; and
generating the transmitting data by performing an XOR operation on the dominant values selected from the (P+L) spread codes acquired from the (P+L) subgroups and one bit of the (P*M+1) bits.

4. The symbol-error correction frequency modulation method of claim 1, wherein in the selecting of the dominant values among the (P+L) spread codes acquired from the (P+L) subgroups, an AND operation is performed on groups of two spread codes among the acquired (P+L) spread codes, an OR operation is performed on the resulting values of the AND operation, and only a most significant bit is selected from the resulting values of the OR operation for the (P+L) spread codes.

5. A symbol-error correction frequency demodulation method using a frequency selective baseband, comprising:
generating a plurality of subgroups by dividing $2^N$ (N is a real number) spread codes used for frequency spreading into $2^M$ (M<N, M is a real number) spread codes;
when modulated data are transmitted from a transmitting stage, acquiring frame synchronization and timing synchronization from transmitting data;
selecting (P+L) (P and L are real numbers) subgroups determined to be used for modulation of the transmitting data among the plurality of subgroups and synchronizing the spread codes of the selected subgroups with the frame synchronization and the timing synchronization;
calculating correlation values between the spread codes of the (P+L) subgroups and the transmitting data and detecting one spread code determined to be selected for the modulation of the transmitting data from each of the (P+L) subgroups;

generating an M-bit index value of the detected spread code of each of the (P+L) subgroups and generating L*M syndrome bits from generated (P+L)*M index values by using a parity check matrix;

generating M*P error pattern bits from the L*M syndrome bits and performing an XOR operation on the generated error pattern bits and M*P index values generated from the P subgroups to correct symbol error; and converting the M*P index values of the symbol-error-corrected parallel data to serial data.

6. The symbol-error correction frequency demodulation method of claim 5, further comprising:

acquiring 1-bit data according to the correlation values of the index values generated from the individual P subgroups; and obtaining parallel data by adding the acquired 1-bit data and the symbol-error-corrected M*P-bit parallel data and converting the parallel data to the serial data.

7. A symbol-error correction frequency modulation apparatus using a frequency selective baseband, comprising:

a plurality of (P+L) (P and L are real numbers) sub-frequency selective spreaders each including one subgroup among a plurality of subgroups generated by dividing $2^N$ (N is a real number) spread codes used for frequency spreading into $2^M$ (M<N, M is a real number) spread codes, each of the P sub-frequency selective spreaders selecting and outputting one spread code among the $2^M$ spread codes of the corresponding subgroup when M data bits are inputted, and each of the L sub-frequency selective spreaders selecting and outputting one spread code among the $2^M$ spread codes of the corresponding subgroup when L*M parity bits are inputted;

a serial-to-parallel conversion unit converting serial data provided from an upper layer to P*M-bit parallel data, outputting the M data bits to each of the P sub-frequency selective spreaders;

a parity bit generation unit acquiring P*M data bits outputted from the serial-to-parallel conversion unit to the P sub-frequency selective spreaders, generating the L*M parity bits for symbol error correction from the acquired P*M data bits, and outputting the L*M parity bits to the L sub-frequency selective spreaders; and a dominant-value selection unit selecting dominant values from (P+L) spread codes outputted from the (P+L) sub-frequency selective spreaders.

8. The symbol-error correction frequency modulation apparatus of claim 7, wherein the serial-to-parallel conversion unit converts the serial data provided from the upper layer to (P*M+1)-bit parallel data, outputs M data bits to each of the selected P sub-frequency selective spreaders, and outputs one bit separately from the P*M bits.

9. The symbol-error correction frequency modulation apparatus of claim 8, further comprising:

an XOR logic circuit performing an XOR operation on the dominant values selected by the dominant-value selection unit and the 1 bit separately outputted from the serial-to-parallel conversion unit so as to increase a transmission data rate.

10. The symbol-error correction frequency modulation apparatus of claim 7, wherein the dominant-value selection unit performs an AND operation on groups of two spread codes among the selected (P+L) spread codes, performs an OR operation on the resulting values of the AND operations, and selects only a most significant bit from the resulting values of the OR operation for the (P+L) spread codes.

11. A symbol-error correction frequency demodulation apparatus using a frequency selective baseband, comprising:

an orthogonal code generator generating a plurality of subgroups by dividing $2^N$ (N is a real number) spread codes used for frequency spreading into $2^M$ (M<N, M is a real number) spread codes, acquiring frame synchronization and timing synchronization from transmitting data, which is modulated data transmitted from a transmitting stage, selecting (P+L) (P and L are real numbers) subgroups determined to be used for modulation of the transmitting data among the plurality of subgroups, and synchronizing and outputting the spread codes of the (P+L) subgroups with the acquired frame synchronization and timing synchronization;

a plurality of (P+L) sub-frequency selective despreaders, each receiving, in a case where the modulated transmitting data is received from the transmitting stage, $2^M$ spread codes from the orthogonal code generator, calculating correlation values between the provided spread codes and the transmitting data, detecting one spread code determined to be selected for the modulation of the transmitting data, and outputting an M-bit index value of the detected spread code;

a syndrome generation unit receiving (P+L)*M index values from the (P+L) sub-frequency selective despreaders, provided with the spread codes of each of the (P+L) subgroups from the orthogonal code generator, and generating L*M syndrome bits from the input index values by using a parity check matrix;

an error pattern generation unit generating M*P error pattern bits from the L*M syndrome bits;

an error bit correction unit performing an XOR operation on M*P index values outputted from the P sub-frequency selective despreaders and the M*P error pattern bits generated by the error pattern generation unit to correct symbol error of the M*P index values; and a parallel-to-serial conversion unit converting the M*P index values of the symbol-error-corrected parallel data to serial data.

12. The symbol-error correction frequency demodulation apparatus of claim 11, further comprising:

a correlation value determination unit receiving the correlation values of the index values outputted from the (P+L) sub-frequency selective despreaders and outputting different 1-bit data according to the received-correlation values.

13. The symbol-error correction frequency demodulation apparatus of claim 12, wherein, in a case where 1-bit data outputted from the correlation value determination unit, together with the P*M index values outputted from the error bit correction unit, are inputted, the parallel-to-serial conversion unit converts parallel data obtained by adding the P*M index values and the 1-bit data to the serial data.

* * * * *